United States Patent
Fan

(10) Patent No.: US 10,360,439 B2
(45) Date of Patent: Jul. 23, 2019

(54) APPARATUS, SYSTEM, METHOD AND COMPUTER PROGRAM PRODUCT FOR RECOGNIZING FACE

(71) Applicants: BEIJING KUANGSHI TECHNOLOGY CO., LTD., Beijing (CN); PINHOLE (BEIJING) TECHNOLOGY CO., LTD., Beijing (CN)

(72) Inventor: Haoqiang Fan, Beijing (CN)

(73) Assignees: BEIJING KUANGSHI TECHNOLOGY CO., LTD., Beijing (CN); PINHOLE (BEIJING) TECHNOLGY CO., LTD., Beijing (CN)

( * ) Notice: Subject to any disclaimer, the term of this patent is extended or adjusted under 35 U.S.C. 154(b) by 0 days.

(21) Appl. No.: 14/888,365

(22) PCT Filed: Apr. 28, 2015

(86) PCT No.: PCT/CN2015/077692
§ 371 (c)(1),
(2) Date: Sep. 1, 2016

(87) PCT Pub. No.: WO2016/172856
PCT Pub. Date: Nov. 3, 2016

(65) Prior Publication Data
US 2017/0004355 A1    Jan. 5, 2017

(51) Int. Cl.
*G06K 9/00* (2006.01)
*G06K 9/20* (2006.01)
(Continued)

(52) U.S. Cl.
CPC ..... *G06K 9/00288* (2013.01); *G06K 9/00255* (2013.01); *G06K 9/00281* (2013.01);
(Continued)

(58) Field of Classification Search
CPC ........... G06K 9/00288; G06K 9/00255; G06K 9/00281; G06K 9/2027; G06K 9/2036;
(Continued)

(56) References Cited

U.S. PATENT DOCUMENTS

2013/0215235 A1* 8/2013 Russell .............. H04N 13/0203
348/47
2015/0256813 A1* 9/2015 Dal Mutto ........... G06K 9/2036
348/47

FOREIGN PATENT DOCUMENTS

CN         101339607    *  1/2009
CN         102208032       10/2011
(Continued)

OTHER PUBLICATIONS

International Search Report and Written Opinion issued in the corresponding International application No. PCT/CN2015/077692, dated Feb. 2, 2016, 18 pages.
(Continued)

*Primary Examiner* — Christopher Braniff
(74) *Attorney, Agent, or Firm* — Hamre, Schumann, Mueller & Larson, P.C.

(57) ABSTRACT

There is disclosed an apparatus, system, method and computer program product for recognizing a face, the method comprising: emitting at least one group of structured light to a face to be recognized, successively; capturing a set of light-source-illuminated images of the face when the face is illuminated successively by each group of light of the at least one group of structured light; extracting a first set of features including a feature of each detection point in a set of detection points of the face based on the set of light-source-illuminated images; acquiring a second set of features including a feature of each detected point in a set of detected points of a face template; computing a similarity between the face and the face template based on the first set of
(Continued)

features and the second set of features; and recognizing the face as being consistent with the face template if the similarity is larger than a threshold.

19 Claims, 6 Drawing Sheets

(51) Int. Cl.
    *G06K 9/46*         (2006.01)
    *H04N 13/254*     (2018.01)

(52) U.S. Cl.
    CPC .......... *G06K 9/2027* (2013.01); *G06K 9/2036* (2013.01); *G06K 9/4661* (2013.01); *H04N 13/254* (2018.05); *G06K 2209/401* (2013.01)

(58) Field of Classification Search
    CPC ........... G06K 9/4661; G06K 2209/401; H04N 13/0253
    See application file for complete search history.

(56) References Cited

FOREIGN PATENT DOCUMENTS

| | | |
|---|---|---|
| CN | 102346857 | 2/2012 |
| CN | 102567706 | 7/2012 |
| CN | 102930257 | 2/2013 |

OTHER PUBLICATIONS

First Chinese Office Action, issued in the corresponding Chinese patent application No. 201580000322.9, dated Jul. 30, 2018, 29 pages.

\* cited by examiner

# APPARATUS, SYSTEM, METHOD AND COMPUTER PROGRAM PRODUCT FOR RECOGNIZING FACE

TECHNICAL FIELD

The present disclosure relates to the field of face recognition, and particularly to an apparatus, system, method and computer program product for recognizing a face.

BACKGROUND

Presently, a face recognition system using a camera has been widely used. In an ordinary face recognition system, a passive image capture method is used. That is, the system only receives light but does not emit the light actively, or uses only a light supplement lamp to emit the light for the purpose of illumination only and without a structure. A face signal which is captured in this way is largely influenced by factors such as a change of ambient lighting, a change of a person's attitude or the like. When an angle of the face is changed, for example, when the face is turned to a side or is raised up, the image of the face will change largely, resulting in that the recognition becomes very difficult. When the ambient lighting is changed, for example, when the position of the sun is changed or when the surrounding light is turned on or off, the captured image will change very significantly. Such factors prevent the accuracy of a general face recognition system from being improved.

SUMMARY

According to one aspect of the present disclosure, there is provided a system for recognizing a face, comprising: a light source generation module operative to emit at least one group of structured light to a face to be recognized, successively; an image capture module operative to capture a set of light-source-illuminated images of the face when the face is illuminated successively by each group of light of the at least one group of structured light; a processor; a memory; and computer program instructions stored in the memory, which, when executed by the processor, perform steps of: extracting a first set of features including a feature of each detection point in a set of detection points of the face based on the set of light-source-illuminated images, the feature of each detection point comprising at least one of position information indicating three dimensional relative coordinates of the detection point, surface information indicating a relative surface normal of the detection point, and material information indicating a light absorption characteristic of the detection point; acquiring a second set of features including a feature of each detected point in a set of detected points of a face template; computing a similarity between the face and the face template based on the first set of features and the second set of features; and recognizing the face as being consistent with the face template if the similarity is larger than a threshold.

According to another aspect of the present disclosure, there is provided a method for recognizing a face, comprising: emitting at least one group of structured light to a face to be recognized, successively; capturing a set of light-source-illuminated images of the face when the face is illuminated successively by each group of light of the at least one group of structured light; extracting a first set of features including a feature of each detection point in a set of detection points of the face based on the set of light-source-illuminated images, the feature of each detection point comprising at least one of position information indicating three dimensional relative coordinates of the detection point, surface information indicating a relative surface normal of the detection point, and material information indicating a light absorption characteristic of the detection point; acquiring a second set of features including a feature of each detected point in a set of detected points of a face template; computing a similarity between the face and the face template based on the first set of features and the second set of features; and recognizing the face as being consistent with the face template if the similarity is larger than a threshold.

According to a further aspect of the present disclosure, there is provided a device for recognizing a face, comprising: a light source generation module operative to emit at least one group of structured light to a face to be recognized, successively; an image capture module operative to capture a set of light-source-illuminated images of the face when the face is illuminated successively by each group of light of the at least one group of structured light; an extraction module operative to extract a first set of features including a feature of each detection point in a set of detection points of the face, based on the set of light-source-illuminated images, the feature of each detection point comprising at least one of position information indicating three dimensional relative coordinates of the detection point, surface information indicating a relative surface normal of the detection point, and material information indicating a light absorption characteristic of the detection point; an acquisition module operative to acquire a second set of features including a feature of each detected point in a set of detected points of a face template; a computation module operative to compute a similarity between the face and the face template based on the first set of features and the second set of features; and a recognition module operative to recognize the face as being consistent with the face template if the similarity is larger than a threshold.

According to a further aspect of the present disclosure, there is provided an apparatus for recognizing a face, comprising: a light source generation module operative to emit at least one group of structured light to a face to be recognized, successively; an image capture module operative to capture a set of light-source-illuminated images of the face when the face is illuminated successively by each group of light of the at least one group of structured light; and a transmission module operative to transmit the set of light-source-illuminated images to a computer communicatively connected with the apparatus.

According to a further aspect of the present disclosure, there is provided an apparatus for recognizing a face, comprising: a light source generation module operative to emit at least one group of structured light to a face to be recognized, successively; an image capture module operative to capture a set of light-source-illuminated images of the face when the face is illuminated successively by each group of light of the at least one group of structured light; an extraction module operative to extract a first set of features including a feature of each detection point in a set of detection points of the face, based on the set of light-source-illuminated images, the feature of each detection point comprising at least one of position information indicating three dimensional relative coordinates of the detection point, surface information indicating a relative surface normal of the detection point, and material information indicating a light absorption characteristic of the detection point; and a transmission module operative to transmit the first set of features to a computer communicatively connected with the apparatus.

According to a further aspect of the present disclosure, there is provided a computer program product comprising a computer readable storage medium having stored thereon computer program instructions, which, when executed by a computer, perform steps of extracting a first set of features including a feature of each detection point in a set of detection points of the face based on a set of light-source-illuminated images of a face captured when the face is illuminated successively by each group of light of at least one group of structured light, the features of each detection point comprising at least one of position information indicating three dimensional relative coordinates of the detection point, surface information indicating a relative surface normal of the detection point, and material information indicating a light absorption characteristic of the detection point; acquiring a second set of features including a feature of each detected point in a set of detected points of a face template; computing a similarity between the face and the face template based on the first set of features and the second set of features; and recognizing the face as being consistent with the face template if the similarity is larger than a threshold.

With the apparatuses, system, method and computer program product according to the above aspects of the present disclosure, the face recognition can be performed without being influenced by the change of the ambient lighting, the attitude of the face or the like. Thereby, the accuracy of the face recognition is improved largely.

BRIEF DESCRIPTION OF THE DRAWINGS

The above and other objects, features and advantages of the present disclosure will become more apparent through the more detailed description of exemplary embodiments of the present disclosure in conjunction with the accompanying drawings where the same reference number generally refers to the same component, in which.

DETAILED DESCRIPTION

In order to make the objects, technical schemes and advantages of the present disclosure more apparent, exemplary embodiments of the present disclosure will be described in detail with reference to attached drawings in the following. Apparently, the described embodiments are only a part of, but not all, embodiments of the present disclosure. It should be understood that the present disclosure is not limited to exemplary embodiments described here. Based on embodiments described in the present disclosure, all of other embodiments obtained by those of ordinary skills in the art without any inventive labour shall fall within the protection scope of the present disclosure.

First, a main configuration of a system for recognizing a face according to an embodiment of the present disclosure will be described with reference to FIG. 1.

Figure 1:
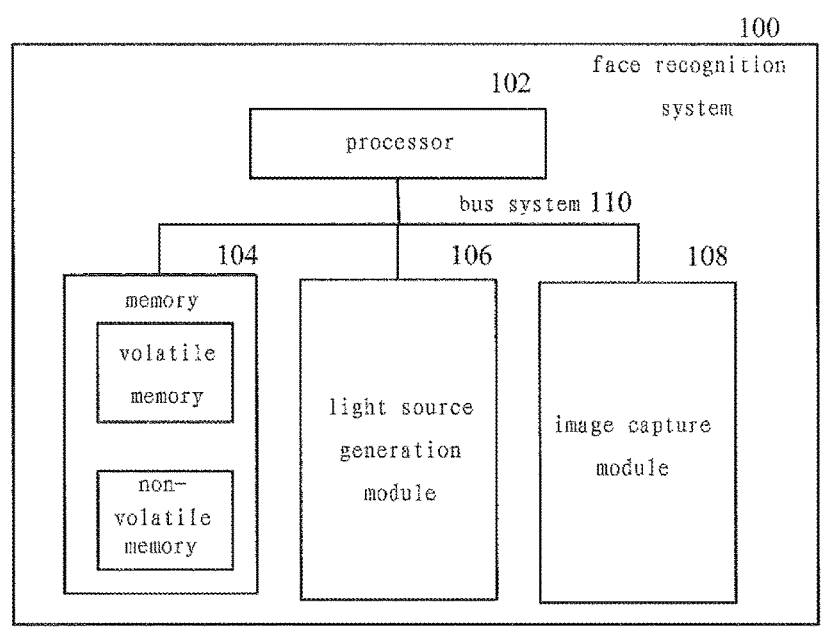
FIG. 1 is a block diagram schematically illustrating a system to which a method for recognizing a face may be applied according to an embodiment of the present disclosure.

As shown in FIG. 1, a system 100 for recognizing a face in an embodiment of the present disclosure mainly includes one or more processor(s) 102, one or more memory (memories) 104, a light source generation module 106 and an image capture module 108. These components are interconnected with each other through a bus system 110 and/or a connection mechanism in other forms (not shown).

In particular, the processor 102 may be a Central Processing Unit (CPU) or a processing unit in other forms having a data processing capability and/or an instruction execution capability, and may control other components in the system 100 to perform a desired function.

The memory 104 may include one or more computer program product(s) which may include computer readable storage media in various forms, for example, a volatile memory and/or a non-volatile memory. The volatile memory may, for example, include a Random Access Memory (RAM) and/or a cache memory (cache) or the like. The non-volatile memory may, for example, include a Read Only Memory (ROM), a hard disk, a flash memory or the like. There may be one or more computer program instructions stored on the computer readable storage media, which may be executed by the processor 102 so as to implement respective functions and/or other desired functions of the face recognition method of an embodiment of the present disclosure as described hereinafter.

The light source generation module 106 is, for example, a light source module including any one of a laser, a LED or the like, for emitting at least one group of structured light to the face to be recognized, successively.

Figure 2:
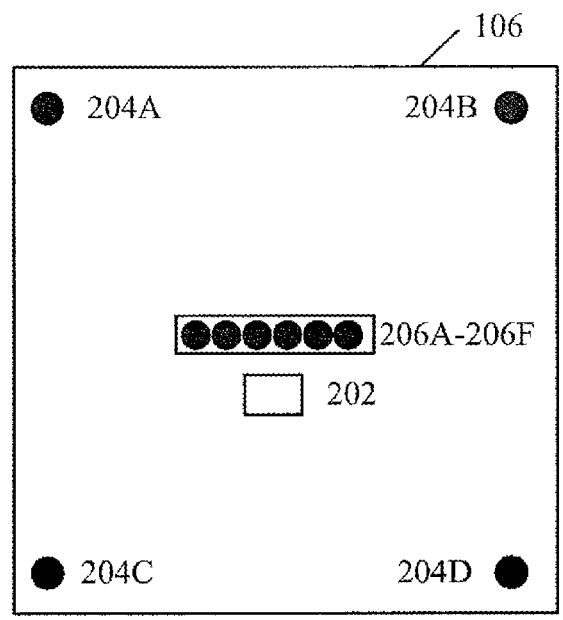
FIG. 2 is a diagram schematically illustrating a detailed configuration of a light source generation module in the system according to an embodiment of the present disclosure.

In particular, FIG. 2 schematically shows a more detailed configuration of the light source generation module 106 in the embodiment of the present disclosure. In FIG. 2, the light source generation module 106 in the embodiment of the present disclosure includes a first group of light sources 202, a second group of light sources 204A-204D and a third group of light sources 206A-206F. In a case that there is no need to separate them from each other, the second group of light sources 204A-204D are collectively referred to as the second group of light source 204, and the third group of light sources 206A-206F are collectively referred to as the third group of light sources 206.

It is to be noted that, although the above three groups of light sources are shown schematically in FIG. 2, the light source generation module in the embodiment of the present disclosure does not necessarily include all of them, but may include any one or more groups of light sources among them. Of course, the light source generation module in the embodiment of the present disclosure may also include other light sources than the above three groups of light sources.

In particular, the first group of light sources 202 includes a laser. Exemplarily, the laser may be an infrared dot laser. Exemplarily, the wavelength of the infrared dot laser is 850 nm. A raster of a predetermined pattern is arranged between the laser and the face. Thereby, the laser may project light of the predetermined pattern toward the face through the raster.

Figure 3:
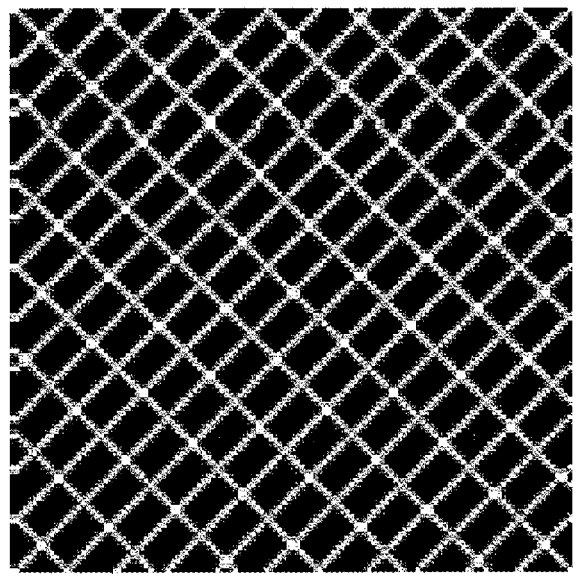
FIG. 3 is a diagram schematically illustrating a pattern projected by a raster of the light source generation module according to an embodiment of the present disclosure.

FIG. 3 schematically shows a pattern projected by the raster in the embodiment of the present disclosure. As shown in FIG. 3, exemplarily, the pattern is a double slash pattern in which each of two groups of slashes is formed of a group of parallel lines. These two groups of parallel lines are vertical to each other, and intersection angles of 45 degree, for example, are formed between the vertical direction and them. The spacing between lines of these two groups of parallel lines may be, for example, 0.002 rad, 0.003 rad or the like.

It is to be noted that, FIG. 3 is only one example of the raster in the embodiment of the present disclosure, and the present disclosure is not limited thereto, but may include other raster of various predetermined patterns.

Back to FIG. 2, the second group of light sources 204A-204D is formed of, for example, LED light sources. Exemplarily, the second group of light sources 204 is formed of infrared LEDs. Exemplarily, the wavelengths of the infrared LEDs are 850 nm. Each light source of the second group of light sources 204 is located at a different position, and they form a rectangle spatially, with the plane where the rectangle is located facing the face to be recognized.

It is to be noted that, although the second group of light sources 204 includes four light sources and the four light sources form a rectangle spatially as shown in FIG. 2, the present disclosure is not limited thereto, but may include other number of light sources with other arrangements, as long as the number of the light sources is more than two and the directions in which the face is illuminated by at least three light sources of the more than two light sources are not correlated linearly.

Back to FIG. 2, the third group of light sources 206A-206F is formed of, for example, LED light sources. Exemplarily, the third group of light sources 206 is formed of, for example, infrared LEDs. Exemplarily, the wavelengths of the infrared LEDs are between 532 nm and 940 nm, and the wavelength of each light source of the third group of light sources 206A-206F may be different. Respective light sources of the third group of light sources 206A-206F are arranged adjacently in space.

It is to be noted that, although it is shown in FIG. 2 that the third group of light sources 206 includes six light sources and that the six light sources are arranged adjacently in a straight line in space, the present disclosure is not limited thereto, instead it may include other numbers of light sources with other arrangements, as long as the number of the light sources is more than two and the light sources are arranged adjacently in space. For example, the third group of light sources 206 may include four light sources, and the four light sources are arranged adjacently with a square structure of 2*2 in space.

Back to FIG. 1, the image capture module 108 is, for example, a unit such as a camera or the like, operative to capture a set of light-source-illuminated images of the face when the face is illuminated successively by each group of light of at least one group of structured light. Exemplarily, the image capture module 108 may be formed of a single-color camera. For example, in the above case in which the infrared-band light source generation module is used, the image capture module 108 may be an infrared camera correspondingly. Exemplarily, the frame rate of the image capture module 108 is larger than or equal to 120 fps and the resolution thereof is larger than or equal to 1080p.

It is to be noted that, the components and the structure of the system 100 shown in FIG. 1 are only exemplary but not limiting, and the system 100 may also have other components and structures depending on requirements.

For example, the system may further include input means and output means which are not shown. The input means may be a means for a user to input an instruction and may include one or more of a keyboard, a mouse, a microphone, a touch screen or the like. The instruction is, for example, an instruction for using the image capture module 108 to capture an image. The output means may output various information (e.g. an image or a sound) to the external (e.g. a user), and may include one or more of a display, a speaker or the like. The information may be, for example, a recognition result of the system or the like.

In the following, a method for recognizing a face according to an embodiment of the present disclosure is described with reference to FIG. 4.

Figure 4:
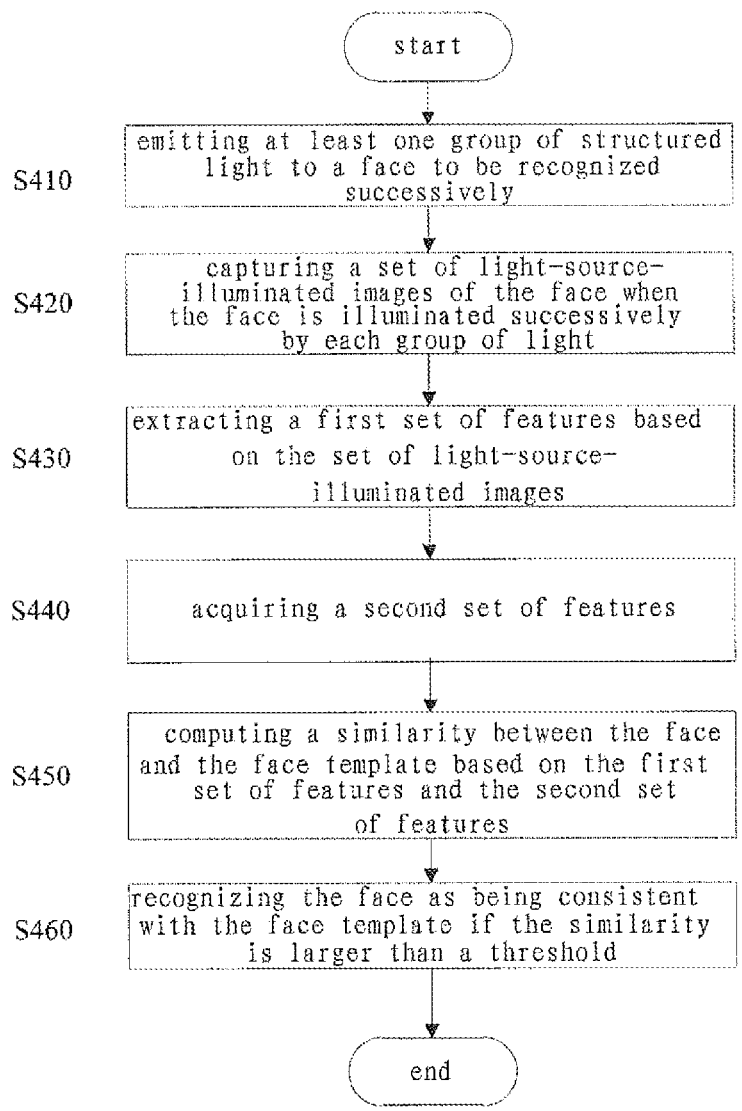
FIG. 4 is a flowchart schematically illustrating main steps of a face recognition method according to an embodiment of the present disclosure.

FIG. 4 is a flowchart schematically illustrating main steps of a face recognition method according to an embodiment of the present disclosure. As shown in FIG. 4, first, at a step S410, the method emits at least one group of structured light to a face to be recognized, successively. In particular, the at least one group of structured light includes at least one of a first group of light emitted by the laser in the first group of light sources, a second group of light formed of light emitted successively by each light source of the second group of light sources, and a third group of light formed of light emitted successively by each light source of the third group of light sources.

Next, at a step S420, the method captures a set of light-source-illuminated images of the face when the face is illuminated successively by each group of light of the at least one group of structured light. For example, in the case of the light source generation module shown in FIG. 2, the method may capture an image of the face when the face is illuminated by the light of the laser 202, a set of images (with a number of four) when the face is illuminated successively by the light of each of LEDs 204A-204D, and a set of images (with a number of six) when the face is illuminated successively by the light of each of LEDs 206A-206F, respectively, so as to obtain a set of light-source-illuminated images with a number of eleven.

Then, at a step S430, the method extracts a first set of features including a feature of each detection point in a set of detection points of the face based on the set of light-source-illuminated images. The feature of each detection point includes at least one of position information on the detection point, surface information on the detection point and material information on the detection point. In particular, the position information indicates three-dimensional relative coordinates of the detection point. The surface information indicates a relative surface normal of the detection point. The material information indicates a light absorption characteristic of the detection point.

It is to be noted that, when the features are to be extracted, as a preparation, the method may firstly detect a face region image of each light-source-illuminated image in the set of light-source-illuminated images. Exemplarily, the method may detect the face region image by a way of a Haar Cascade face detector for example, and extract the first set of features based on the face region image while ignoring other portions. In the following description, the light-source-illuminated image used in the extraction of the features refers to the face region image in the light-source-illuminated image.

In addition, it is to be noted that the extraction processes of the position information, the surface information and the material information may be independent from each other. Thus, the extraction process of each of the three kinds of the information as described above will be described in detail respectively, by way of two specific examples below.

In a first example, first, as for the position information, the method extracts the position information on each detection point based on the first light-source-illuminated image captured when the face is illuminated by the first group of light sources.

In particular, after the image capture module captures the first light-source-illuminated image formed by the laser projecting the first group of light to the face through the raster as shown in FIG. 3, the method may perform a pre-processing such as a low pass filtering or the like, on the first light-source-illuminated image, in a way of Gaussian Blur, for example.

Thereafter, the method computes directional gradients of the first light-source-illuminated image in directions of, for example, (1,1) and (1,−1) of the image, and takes a local extreme in the computed directional gradients to determine the position of the projected two groups of parallel lines in the first light-source-illuminated image, so as to determine pixel points corresponding to predetermined points of the raster, in the first light-source-illuminated image. Exemplarily, the predetermined points are intersection points intersected by the two groups of slashes with each other.

Next, the method computes the three dimensional coordinates of the detection points corresponding to the pixel points, with respect to the image capture module, and thereby determines a set of three dimensional coordinates including the three dimensional coordinates of all the detection points in the set of detection points. In particular, the method may determine the three dimensional coordinates of the detection points with respect to the image capture module by a triangulation ranging principle, for example. In more particular, the method may compute the three dimensional coordinate (x,y,z) of a detection point by an expression (1) as follows:

$$\begin{cases} x = z \times (x_0 - c_x)/f \\ y = z \times (y_0 - c_y)/f \\ z = L \times \sin(\alpha)/\sin(\alpha + \beta) \end{cases} \quad (1)$$

Wherein $(x_0,y_0)$ is coordinates of the pixel point corresponding to the detection point, in the first light-source-illuminated image, f is a camera's focal length of the image capture module, $(c_x,c_y)$ is corresponding coordinates of the camera's optical centre of the image capture module, in the first light-source-illuminated image, L is a distance between the camera and the light source (laser), α is an intersection angle formed by a connection line between the detection point and the light source and a connection line between the camera and the light source, and β is an intersection angle formed by a connection line between the detection point and the camera and the connection line between the camera and the light source.

After the three dimensional coordinates of the detection points corresponding to all the predetermined points (e.g. the intersection points of two groups of slashes) are obtained, the method may compute the three dimensional coordinates of all the detection points in various ways such as an interpolation or the like. Exemplarily, the method selects, for each of all the pixel points in the first light-source-illuminated image, several (e.g. four) predetermined points closest to the pixel point, and computes the three dimensional coordinates of the detection points corresponding to the pixel points using a linear interpolation method so as to obtain the set of three dimensional coordinates.

Thereafter, the method may determine a particular detection point in the set of detection points based on the set of three dimensional coordinates. For example, the method may determine a point whose z coordinate is minimum (i.e. the point closest to the camera) as a position of a nasal tip in the face. Thereby, the method may, for example, compute the three dimensional relative coordinates of other detection points in the set of detection points with respect to the particular detection point, with the above particular detection point as the origin, so as to obtain a matrix P of three columns formed of the three dimensional relative coordinates of all the detection points in the set of detection points.

Next, the method performs a singular value decomposition process on the matrix of three columns P=Up Sp Vp, and then performs a normalization process thereon Q=PVp$^T$. The obtained matrix Q is a set of position information for the set of detection points, including the position information $(p_x,p_y,p_z)$ on each detection point. The matrix Q remains unchanged under an orthogonal transformation of P. In other words, the obtained position information on each detection point is not influenced by the ambient lighting, the face's attitude or the like.

As for the surface information, first, after the image capture module captures the second group of light-source-illuminated images formed by each light source in the second group of light sources emitting the light to the face successively, the method computes a mean image of the second group of light-source-illuminated images. For example, it is assumed that the image captured by the image capture module when the face is illuminated by the light source 204A as shown in FIG. 2 is I[3], the image captured by the image capture module when the face is illuminated by the light source 204B as shown in FIG. 2 is I[4], the image captured by the image capture module when the face is illuminated by the light source 204C as shown in FIG. 2 is I[5], and the image captured by the image capture module when the face is illuminated by the light source 204D as shown in FIG. 2 is I[6]. The method firstly computes M=(I[3]+I[4]+I[5]+I[6])/4.

Next, the method computes a set of differential images between the second group of light-source-illuminated images and the mean image. That is, the method computes: H[1]=I[3]−M, H[2]=I[4]−M, H[3]=I[5]−M, H[4]=I[6]−M, successively.

Then, the method determines a matrix of at least four columns, which includes a vector of at least four dimensions of each detection point of the set of detection points, with the vector of at least four dimensions of each detection point being formed of a pixel value of the pixel point corresponding to the detection point, in the set of differential images. Thereafter, the method performs a singular value decomposition process on the matrix of at least four columns, and obtains the surface information on each detection point based on a result of the singular value decomposition process. In particular, the method regards the pixel values of the pixel point corresponding to each detection point in H[1]-H[4] as a four-dimensional vector h. All the points' h constitute a matrix S of n*4. Thereafter, the method computes the SVD decomposition of S, S=Un Sn Vn, and intercepts the first three columns of Un to obtain a set of surface features for the set of detection points, which is formed of the surface feature $(s_x,s_y,s_z)$ of each detection point. It is known from the Lambertian lighting model that the surface feature of each detection point obtained as above is not influenced by the ambient lighting, the face's attitude or the like.

As for the material information, first, after the image capture module captures the third group of light-source-illuminated images formed by each light source in the third group of light sources emitting the light to the face successively, the method determines, for each detection point, a corresponding set of pixel values of the detection point, in the third group of light-source-illuminated images. Then, the method computes the mean and variance of the set of pixel values, and computes the material information on the detection point based on the mean and variance of the set of pixel values.

In particular, it is assumed that the images captured by the image capture module when the face is illuminated by the light sources 206A-206F as shown in FIG. 2 successively are I[7]–I[12]. Let G[1]=I[7], G[2]=I[8], ... G[6]=I[12]. For i=1 ... 6, the method computes the following expression (2), respectively:

$$\begin{cases} g'[i] = (g[i] - \text{mean}(g)) / \sqrt{\text{var}(g)} \\ \text{mean}(g) = \dfrac{g[1] + g[2] + \ldots + g[6]}{6} \\ \text{var}(g) = \dfrac{(g[1] - \text{mean}(g))^2 + (g[2] - \text{mean}(g))^2 + \ldots + (g[6] - \text{mean}(g))^2}{6} \end{cases} \quad (2)$$

The g'[1]~g'[6] obtained through the above computation constitute the material feature of each detection point. The material features extracted in this way are not influenced by the ambient lighting, the face's attitude or the like.

In the first example as describe above, at least one of the position information, the surface information and the material information on the detection point is extracted based on the set of light-source-illuminated images, so that the first set of features is obtained with less processing and a shorter processing time.

Alternatively, in order to make the feature of each detection point in the obtained first set of features more accurate, the method may extract the feature based on the set of light-source-illuminated images and a non-light-source-illuminated image. In the following, the processing in this case will be described in detail in a second example.

In particular, in the second example, the image capture module further captures a non-light-source-illuminated image of the face when the face is not illuminated by any one group of light of the at least one group of structured light. It is to be noted that, in the present specification, the term "non-light-source-illuminated image" does not mean that there is no light source (e.g. a natural light source), but refers to the image captured when it is not illuminated by the structured light emitted by any one light source of the light source generation module as describe above. Accordingly, the term "light-source-illuminated image" refers to the image captured when it is illuminated by the structured light emitted by any one light source of the light source generation module as describe above. Optionally, the interval between the timing when the image capture module captures the non-light-source-illuminated image and the timing when it captures each light-source-illuminated image of the set of light-source-illuminated images should be made as short as possible, so as to ensure that the face is in the substantially same state when each image is captured.

After the non-light-source-illuminated image is captured as above, firstly, as for the position information, the method extracts the position information on each detection point based on the non-light-source-illuminated image and the first light-source-illuminated image.

In particular, the method may compute a differential image between the first light-source-illuminated image and the non-light-source-illuminated image. Of course, the method may also perform a pre-processing such as a low pass filtering or the like on the differential image in a way of the Gaussian Blur for example.

Thereafter, the method computes the directional gradients of the differential image in the directions of, for example, (1,1) and (1,−1) of the image, and takes a local extreme in the computed directional gradients to determine the position of the projected two groups of parallel lines in the first light-source-illuminated image, that is, to determine pixel points corresponding to predetermined points of the raster in the differential image.

Next, the method computes three dimensional coordinates of a detection point corresponding to the pixel point, with respect to the image capture module, and thereby determines a set of three dimensional coordinates including three dimensional coordinates of all the detection points in the set of detection points. In particular, the method may determine the three dimensional coordinates of the detection points with respect to the image capture module by the triangulation ranging principle for example. In more particular, the method may compute the three dimensional coordinates (x,y,z) of the detection point by the expression (1) as described above, in which $(x_0,y_0)$ is the coordinates of the pixel point corresponding to the detection point in the differential image, f is the camera's focal length of the image capture module, $(c_x,c_y)$ is the corresponding coordinates of the camera's optical centre of the image capture module in the differential image, L is the distance between the camera and the light source (laser), α is the intersection angle formed by the connection line between the detection point and the light source and the connection line between the camera and the light source, and β is the intersection angle formed by the connection line between the detection point and the camera and the connection line between the camera and the light source. After the three dimensional coordinates of the detection points corresponding to all the predetermined points are obtained, the method may compute the three dimensional coordinates of all the detection points in various ways such as the interpolation or the like. Exemplarily, the method selects, for each of all the pixel points in the differential image, several (e.g. four) predetermined points closest to the pixel point, and computes the three dimensional coordinates of the detection points corresponding to the pixel points using a linear interpolation method, so as to obtain the set of three dimensional coordinates.

Thereafter, the method may determine a particular detection point in the set of detection points based on the set of three dimensional coordinates. For example, the method may determine a point whose z coordinate is minimum (i.e. the point closest to the camera) as the position of the nasal tip in the face. Thereby, the method may, for example, compute the three dimensional relative coordinates of other detection points in the set of detection points with respect to the particular detection point, with the above particular detection point as the origin, so as to obtain a matrix P of three columns formed of the three dimensional relative coordinates of all the detection points in the set of detection points.

Next, the method performs a singular value decomposition process on the matrix of three columns P=Up Sp Vp, and then performs a normalization process thereon Q=PVp$^T$. The obtained matrix Q is a set of position information for the set of detection points, including the position information $(p_x,p_y,p_z)$ on each detection point. The matrix Q remains unchanged under the orthogonal transformation of P. In other words, the obtained position information on each detection point is not influenced by the ambient lighting, the face's attitude or the like.

As for the surface information, first, the method computes a set of differential images between the second group of light-source-illuminated images and the non-light-source-illuminated image. For example, it is also assumed that the images captured by the image capture module when the face is illuminated by the light sources 204A-204D as shown in FIG. 2 are I[3]-I[6] respectively, and that the images captured by the image capture module d when the face is not illuminated by any one light source is I[1]. It is assumed that H[1]=I[3]-I[1], H[2]=I[4]-I[1], H[3]=I[5]-I[1], H[4]=I[6]-I[1].

Next, the method determines a matrix of at least four columns, which includes a vector of at least four dimensions of each detection point of the set of detection points, with the vector of at least four dimensions of each detection point being formed of the pixel value of the pixel point corresponding to the detection point, in the set of differential images. Thereafter, the method performs a singular value decomposition process on the matrix of at least four columns, and obtains the surface information on each detection point based on the result of the singular value decomposition process. In particular, the method regards the pixel values of the pixel point corresponding to each detection point in H[1]-H[4] as a four-dimensional vector h. All the points' h constitute a matrix S of n*4. Thereafter, the method computes the SVD decomposition of S, S=Un Sn Vn, and intercepts the first three columns of Un to obtain a set of surface features for the set of detection points, which is formed of the surface feature $(s_x,s_y,s_z)$ of each detection point. It is known from the Lambertian lighting model that the surface features of each detection point obtained as above is not influenced by the ambient lighting, the face's attitude or the like.

As for the material information, first, the method computes a set of differential images between the third group of light-source-illuminated images and the non-light-source-illuminated image. Then, the method determines, for each detection point, a set of corresponding pixel values of the detection point in the set of differential images. Then, the method computes the mean and variance of the set of pixel values, and computes the material information on the detection point based on the mean and variance of the set of pixel values.

In particular, it is assumed that the images captured by the image capture module when the face is illuminated by the light sources 206A-206F as shown in FIG. 2 are I[7]-I[12]. Let G[1]=I[7]-i[1], G[2]=I[8]-I[1], . . . G[6]=I[12]-I[1]. For i=1 . . . 6, the g'[1]~g'[6] obtained by the computation as shown in the above expression (2) constitute the material features of each detection point. The material features extracted in this way are not influenced by the ambient lighting, the face's attitude or the like.

The extraction processes of the position information, the surface information and the material information on each detection point in the first set of features have been described above by a way of two specific examples. It is to be noted that the extraction processes as described above are only examples. Those skilled in the art are able to extract the position information, the surface information and the material information in other ways based on the above, which is also in the scope of the present disclosure.

In addition, it is to be noted that the position information, the surface information and the material information are only some examples of features of the face extracted based on the structured light. Those skilled in the art are able to extract other features of the face based on the above, which is also in the scope of the present disclosure.

After extracting features $X=(p_x,p_y,p_z,s_x,s_y,s_z,g'[1],g'[2],g'[3],g'[4],g'[5],g'[6])$ of each detection point through the processes as described above at the step 430, the method proceeds to a step S440.

At the step S440, the method acquires a second set of features including the feature of each detected point in a set of detected points of a face template. The feature of each detected point in the second set of features may be extracted in advance by a process similar to the process at the step S430 and stored in the memory by a way of for example, a database, the processing procedure of which will not be described in detail.

It is to be noted that, although the step S440 is shown in FIG. 4 as being after steps S410-S430, the method according to the embodiment of the present disclosure is not limited thereto, instead, the step S440 and the steps S410-S430 may be performed in any order (for example, in parallel or reversely).

Then, at a step S450, the method computes a similarity between the face and the face template based on the first set of features and the second set of features.

In particular, first, the method determines, for each detection point in the set of detection points, a corresponding point in the set of detected points of the face template.

In more particular, since the capture interval between each light-source-illuminated image in the set of light-source-illuminated images is very short as described above, the state of the face may be regarded as substantially unchanged. Thus, the method may detect a first set of key points indicating the structure information on the face, in any one light-source-illuminated image of the set of light-source-illuminated images. In the case that the non-light-source-illuminated image is further captured, the method may also detect a first set of key points indicating the structure information on the face in the non-light-source-illuminated image. The key points are, for example, the eyes, the nose, the mouth, the face contour or the like, in the face. Exemplarily, the method may detect the first set of key points by using a face feature detector such as Adaboost Cascade trained in advance. Then, the method may acquire a second set of key points indicating the structure information on the face template, in the face template. The second set of key points may be detected and stored in the database in advance in the same way as that for the first set of key points, which will not be described in detail. Next, the method determines, for each detection point, a corresponding point based on the first set of key points and the second set of key points. Exemplarily, the method may perform a computation in a way of Thin Plate Spline interpolation or the like, to determine the corresponding point of each detection point, in the face template.

After determining the corresponding point, the method computes the difference value $X_d=|X_1-X_2|$ between the feature of the detection point and the feature of the corresponding point, in which $X_1$ is the feature of the detection point, $X_2$ is the feature of the corresponding point, and $X_d$ is the difference value. After performing the computation as describe above for each detection point, the method obtains a set of difference values between all the detection points in the set of detection points and respective corresponding points.

Thereafter, the method uses a pre-trained neutral network, for example a convolution neutral network, to compute the similarity between the face and the face template, based on the set of difference values. The way of using the neutral network to compute the face similarity is known to those skilled in the art and will not be described in detail here.

In the above example, for each detection point of the face to be recognized, a corresponding point in the face template is determined, thus the similarity is computed. Alternatively, it is also possible to determine, for each detected point in the face template, a corresponding point in the face, so as to compute the similarity. That is, the method determines, for each detected point in the set of detected points, a corresponding point in the set of detection points of the face. Then, the method computes the difference value between the feature of the detected point and the feature of the corresponding point to obtain a set of difference values between all the detected points in the set of detected point and respective corresponding points, and uses a pre-trained convolution neutral network to compute the similarity between the face and the face template, based on the set of difference values.

After computing the similarity between the face and the face template through the step S450, at a step 460, the method recognizes the face as being consistent with the face template if the similarity is larger than a threshold. Of course, on the other hand, the method recognizes the face as being inconsistent with the face template if the similarity is smaller than or equal to a threshold.

The method for recognizing the face of the embodiment of the present disclosure has been described above with reference to FIG. 4. In the method, by emitting structured light to the face successively and capturing corresponding images, it is able to extract features of the face which are not influenced by the ambient lighting, the face's attitude or the like, thereby the accuracy of the face recognition may be improved largely.

In the following, a device for recognizing a face according to an embodiment of the present disclosure will be described with reference to FIG. 5.

Figure 5:
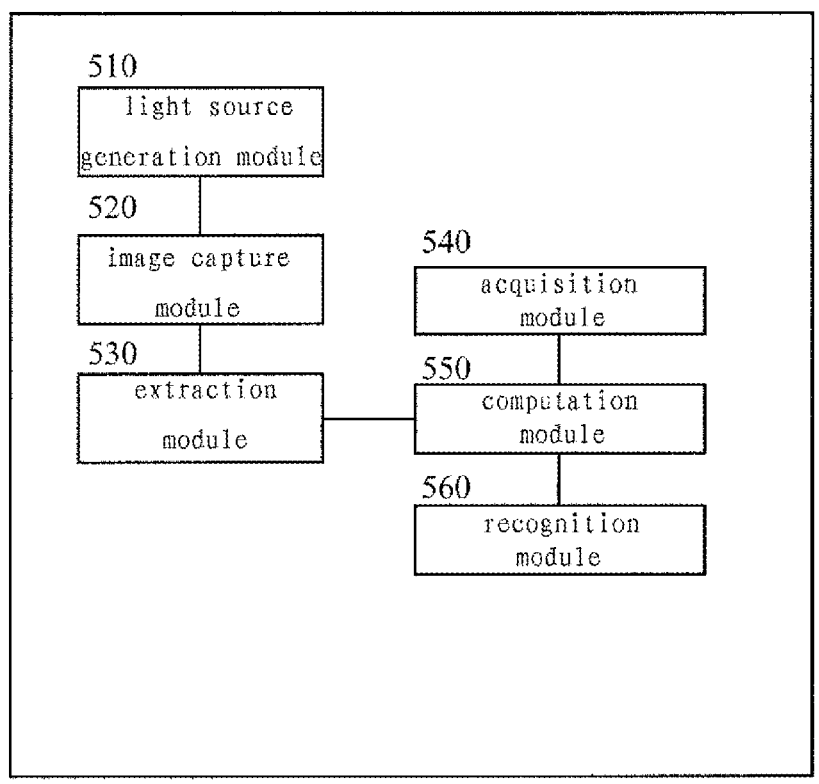
FIG. 5 is a block diagram schematically illustrating a main configuration of a device for recognizing a face according to an embodiment of the present disclosure.

As shown in FIG. 5, a device 500 for recognizing a face according to the embodiment of the present disclosure includes a light source generation module 510, an image capture module 520, an extraction module 530, an acquisition module 540, a computation module 550 and a recognition module 560.

The light source generation module 510 emits at least one group of structured light to a face to be recognized successively.

The image capture module 520 captures a set of light-source-illuminated images of the face when the face is illuminated successively by each group of light of the at least one group of structured light.

The extraction module 530 extracts a first set of features including a feature of each detection point in a set of detection points of the face based on the set of light-source-illuminated images, the feature of each detection point including at least one of position information indicating three dimensional relative coordinates of the detection point, surface information indicating a relative surface normal of the detection point, and material information indicating a light absorption characteristic of the detection point.

The acquisition module 540 acquires a second set of features including a feature of each detected point in a set of detected points of a face template.

The computation module 550 computes a similarity between the face and the face template based on the first set of features and the second set of features.

The recognition module 560 recognizes the face as being consistent with the face template if the similarity is larger than a threshold.

The extraction module 530, the acquisition module 540, the computation module 550 and the recognition module 560 may all be implemented suitably by hardware, software, firmware or any feasible combination thereof. Exemplarily, respective modules of the device 500 in the embodiment of the present disclosure may be implemented by software executed in a computer, and the software, when executed by the computer, performs respective processes as described above.

In an embodiment, the light source generation module 510 includes at least one group of a first group of light sources, a second group of light sources and a third group of light sources. The first group of light sources includes a laser, between which and the face there is arranged a raster of a predetermined pattern. The second group of light sources includes more than two light sources, the directions in which the face is illuminated by at least three light sources of the more than two light sources not being correlated linearly. The third group of light sources includes more than two light sources arranged adjacently in space.

In another embodiment, the at least one group of structured light includes at least one of a first group of light emitted by the laser in the first group of light sources, a second group of light formed of the light emitted successively by each light source in the second group of light sources, and a third group of light formed of the light emitted successively by each light source in the third group of light sources. The extraction module 530 is configured to perform at least one of the following operations: extracting the position information on each detection point based on the first light-source-illuminated image captured when the face is illuminated by the first group of light; extracting the surface information on each detection point based on the second group of light-source-illuminated images captured when the face is illuminated successively by respective beams of light in the second group of light; and extracting the material information on each detection point based on the third group of light-source-illuminated images captured when the face is illuminated successively by respective beams of light in the third group of light. The specific operation of extracting the position information, the surface information and the material information by the extraction module 530 has been described in detail in the face recognition method with reference to FIG. 4, and is not described repeatedly here.

In a further embodiment, the computation module 550 includes: a corresponding point determination module operative to determine, for each detection point in the set of detection points, a corresponding point in the set of detected points of the face template; a difference value computation module operative to compute a difference value between the feature of the detection point and the feature of the corresponding point, to obtain a set of difference values between all the detection points in the set of detection points and respective corresponding points; and a similarity computation module operative to use a pre-trained neutral network, for example, a convolution neutral network, to compute the similarity between the face and the face template, based on the set of difference values.

In a further embodiment, the corresponding point determination module includes: a key point detection module operative to detect a first set of key points indicating structure information on the face in any one light-source-illuminated image of the set of light-source-illuminated images; a key point acquisition module operative to acquire a second set of key points indicating the structure information on the face template, in the face template; and a corresponding point determination sub-unit operative to determine the corresponding point for each detection point based on the first set of key points and the second set of key points.

In a further embodiment, the computation module includes: a corresponding point determination module operative to determine, for each detected point in the set of detected points, a corresponding point in the set of detection points of the face; a difference value computation module operative to compute a difference value between the feature of the detected point and the feature of the corresponding point, to obtain a set of difference values between all the detected points in the set of detected points and respective corresponding points; and a similarity computation module operative to use a pre-trained convolution neutral network to compute the similarity between the face and the face template, based on the set of difference values.

In a further embodiment, the extraction module 530 includes: a face detection module operative to detect a face region image of each light-source-illuminated image in the set of light-source-illuminated images; and an extraction sub-unit operative to extract the first set of features based on the detected face region image of each light-source-illuminated image.

The device for recognizing the face according to the embodiment of the present disclosure has been described above with reference to FIG. 5. In the device, by emitting structured light to the face to be recognized successively and capturing corresponding images, it is able to extract features of the face which are not influenced by the ambient lighting, the face's attitude or the like, thereby the accuracy of the face recognition may be improved largely.

It is to be noted that the face recognition method and system according to the embodiments of the present disclosure may be disposed at a terminal required to perform the face recognition in a centralized fashion, or at a server side (a cloud side) and a terminal in a distributed fashion. In the following, an apparatus for recognizing a face according to embodiments of the present disclosure will be described in detail with reference to FIG. 6 and FIG. 7.

Figure 6:
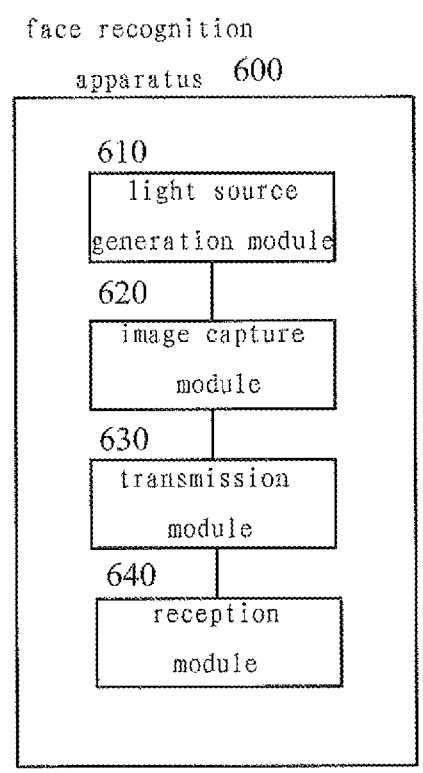
FIG. 6 is a block diagram schematically illustrating a main configuration of an apparatus for recognizing a face according to an embodiment of the present disclosure.

In particular, FIG. 6 is a block diagram schematically illustrating the main configuration of an apparatus for recognizing a face according to an embodiment of the present disclosure.

As shown in FIG. 6, an apparatus 600 for recognizing a face according to the embodiment of the present disclosure mainly includes a light source generation module 610, an image capture module 620, a transmission module 630 and a reception module 640.

The light source generation module 610 emits at least one group of structured light to a face to be recognized, successively. The image capture module 620 captures a set of light-source-illuminated images of the face when the face is illuminated successively by each group of light of the at least one group of structured light. The transmission module 630 transmits the set of light-source-illuminated images to a computer communicatively connected with the apparatus. The reception module 640 receives a recognition result of the face from the computer. The apparatus 600 for recognizing the face may not include the reception module 640. Instead, a reception module may be arranged at a suitable position on other apparatus connected with the apparatus 600 for recognizing the face.

The specific configuration and operation of the light source generation module 610 and the image capture module 620 have been described in detail before with reference to FIGS. 1-5, and are not be described repeatedly here. The transmission module 630 and the reception module 640 may be implemented as communication modules communicating with the computer via various communication protocols. The communication may be a wired or wireless communication.

The computer includes: a reception module operative to receive the set of light-source-illuminated images from the apparatus; a processor; a memory; computer program instructions stored in the memory, which, when executed by the processor, perform steps of extracting a first set of features indicating features of a set of detection points of the face based on the set of light-source-illuminated images, acquiring a second set of features indicating features of a set of detected points of a face template, computing a similarity between the face and the face template based on the first set of features and the second set of features, and recognizing the face as being consistent with the face template if the similarity is larger than a threshold; and a transmission module operative to transmit a face recognition result to a recognition result reception module. The recognition result reception module may be the above reception module 640 arranged inside the apparatus 600 for recognizing the face, or may be a reception module arranged at other suitable position.

In the apparatus 600 for recognizing the face described with reference to FIG. 6, the captured light-source-illuminated image is transmitted to, for example, the computer located at the cloud side, and the computer performs the operation as described above and then returns the result to the apparatus 600 for recognizing the face. Thereby, it is able to extract features of the face which are not influenced by the ambient lighting, the face's attitude or the like, and the accuracy of the face recognition may be improved largely. Thus, even if the processing capability of the apparatus at the terminal is limited, the face recognition may be realized by cooperation with the computer at the server side. Furthermore, the apparatus at the terminal is not necessary to store the second set of features of numerous face templates, so that the storage requirement for the apparatus is reduced.

Alternatively, in a case that the speed of the communication between the apparatus at the terminal and the computer at the server is not fast or in a case that the processing capability of the apparatus at the terminal is relatively strong, the apparatus may extract the first set of features at the terminal and transmits the extracted first set of features to the server located at the cloud side.

Figure 7:
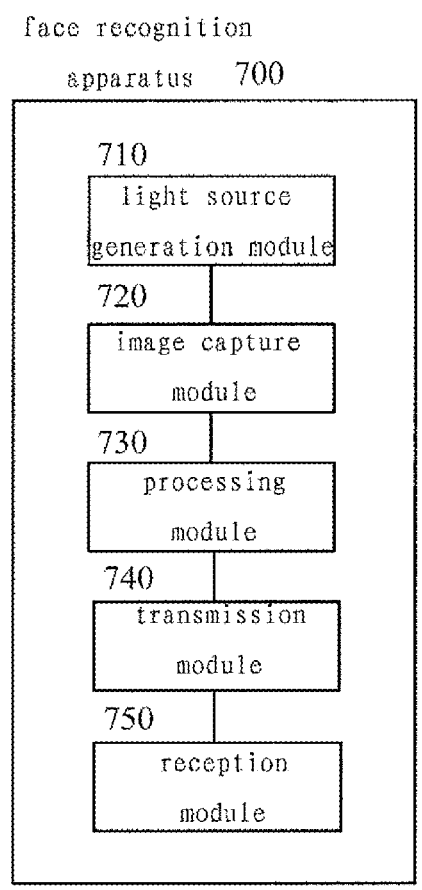
FIG. 7 is a block diagram schematically illustrating a main configuration of an apparatus for recognizing a face according to another embodiment of the present disclosure.

FIG. 7 is a block diagram schematically illustrating the main configuration of an apparatus for recognizing a face according to another embodiment of the present disclosure.

As shown in FIG. 7, an apparatus 700 for recognizing a face according to the embodiment of the present disclosure mainly includes a light source generation module 710, an image capture module 720, a processing module 730, a transmission module 740 and a reception module 750.

The light source generation module 710 emits at least one group of structured light to a face to be recognized, successively. The image capture module 720 captures a set of light-source-illuminated images of the face when the face is illuminated successively by each group of light of the at least one group of structured light. The processing module 730 extracts a first set of features indicating features of a set of detection points of the face based on the set of light-source-illuminated images. The transmission module 740 transmits the first set of features to a computer communicatively connected with the apparatus. The reception module 750 receives a recognition result of the face from the computer. The apparatus 700 for recognizing the face may not include the reception module 750. Instead, a reception module is arranged at a suitable position on other apparatus connected with the apparatus 700 for recognizing the face.

The specific configuration and operation of the light source generation module 710 and the image capture module 720 have been described in detail before with reference to FIGS. 1-5, and are not described repeatedly here. The processing module 730 may be implemented as various processing units having the data processing capability and/or the instruction execution capability. The transmission module 740 and the reception module 750 may be implemented as communication modules communicating with the computer via various communication protocols. The communication may be a wired or wireless communication.

The computer includes: a reception module operative to receive the first set of features from the apparatus; a processor; a memory; a computer program instruction stored in the memory, which performs, when executed by the processor, steps of acquiring a second set of features indicating features of a set of detected points of a face template, computing a similarity between the face and the face template based on the first set of features and the second set of features, and recognizing the face as being consistent with the face template if the similarity is larger than a threshold; and a transmission module operative to transmit a face recognition result to the apparatus.

In the apparatus 700 for recognizing the face described with reference to FIG. 7, the first set of features extracted based on the captured light-source-illuminated image is transmitted to, for example, the computer located at the cloud side, and the computer performs the operation as described above and then returns the result to the apparatus 700 for recognizing the face. Thereby, it is able to extract features of the face which are not influenced by the ambient lighting, the face's attitude or the like, and the accuracy of the face recognition may be improved largely. Thus, even if the processing capability of the apparatus at the terminal is limited, the face recognition may be realized by cooperation with the computer at the server side. Furthermore, the apparatus at the terminal is not necessary to store the second set of features of numerous face templates, so that the storage requirement for the apparatus is reduced. In addition, as compared with the face recognition apparatus shown in FIG. 6, since only the first set of features, the data size of which is relatively small, is transmitted while images, the data size of which is large, are not necessary to be transmitted, the communication traffic between the apparatus at the terminal and the computer at the server side may be reduced.

In addition, according to an embodiment of the present disclosure, there is further provided a computer program product. The computer program product according to the embodiment of the present disclosure includes a computer readable storage medium having stored thereon one or more computer program instruction(s).

When executed by the computer, the computer program instruction(s) may realize functions of respective functional modules of the system for recognizing the face according to embodiments of the present disclosure, and/or may perform the method for recognizing the face according to embodiments of the present disclosure.

For example, when executed by the computer, the computer program instruction(s) may perform steps of: extracting a first set of features including a feature of each detection point in a set of detection points of the face based on a set of light-source-illuminated images of a face to be recognized, the set of light-source-illuminated images being captured when the face is illuminated successively by each group of light of at least one group of structured light, the feature of each detection point including at least one of position information indicating three dimensional relative coordinates of the detection point, surface information indicating a relative surface normal of the detection point, and material information indicating a light absorption characteristics of the detection point; acquiring a second set of features including a feature of each detected point in a set of detected points of a face template; computing a similarity between the face and the face template based on the first set of features and the second set of features; and recognizing the face as being consistent with the face template if the similarity is larger than a threshold.

The computer readable storage medium may include, for example, a memory card of a smart phone, a storage means of a tablet computer, a hard disk of a personal computer, a Random Access Memory (RAM), an Read-Only Memory (ROM), an Erasable Programmable Read-Only Memory (EPROM), a portable Compact-Disc Read-Only Memory (CD-ROM), a USB memory or any combination of the above storage media.

Exemplary embodiments of the present disclosure described in detail above are only illustrative but not limiting. It is understood by those skilled in the art that a variety of modifications, combinations or sub-combinations may be made to these embodiments without departing from the principle and spirit of the present disclosure, and that such modifications, combinations or sub-combinations should fall within the scope of the present disclosure.

What is claimed is:

1. A system for recognizing a face, comprising:
    a light source operative to emit at least one group of structured light to a face to be recognized, successively;
    a camera operative to capture a set of light-source-illuminated images of the face when the face is illuminated successively by each group of light of the at least one group of structured light;
    a processor;
    a memory; and
    computer program instructions stored in the memory, which, when executed by the processor, perform steps of:
    extracting a first set of features including a feature of each detection point in a set of detection points of the face based on the set of light-source-illuminated images, the feature of each detection point comprising at least one of position information indicating three dimensional relative coordinates of the detection point, surface information indicating a relative surface normal of the detection point, and material information indicating a light absorption characteristic of the detection point;
    acquiring a second set of features including a feature of each detected point in a set of detected points of a face template;

computing a similarity between the face and the face template based on the first set of features and the second set of features; and recognizing the face as being consistent with the face template if the similarity is larger than a threshold.

2. The system according to claim 1, wherein the light source comprises at least one of a first group of light sources, a second group of light sources and a third group of light sources;

the first group of light sources comprises a laser, between which and the face there is arranged a raster of a predetermined pattern;

the second group of light sources comprises more than two light sources, directions in which the face is illuminated by at least three light sources of the more than two light sources not being correlated linearly;

the third group of light sources comprises more than two light sources arranged adjacently in space.

3. The system according to claim 2, wherein the at least one group of structured light comprises at least one of a first group of light emitted by the laser in the first group of light sources, a second group of light formed of the light emitted successively by each light source in the second group of light sources, and a third group of light formed of the light emitted successively by each light source in the third group of light sources;

extracting the first set of features including a feature of each detection point in the set of detection points of the face comprises at least one of:

extracting the position information on each detection point, based on a first light-source-illuminated image captured when the face is illuminated by the first group of light;

extracting the surface information on each detection point, based on a second group of light-source-illuminated images captured when the face is illuminated successively by respective beams of light in the second group of light; and extracting the material information on each detection point, based on a third group of light-source-illuminated images captured when the face is illuminated successively by respective beams of light in the third group of light.

4. The system according to claim 3, wherein extracting the position information on each detection point comprises:

computing a directional gradient of the first light-source-illuminated image to determine a pixel point corresponding to a predetermined point of the raster in the first light-source-illuminated image;

computing three dimensional coordinates of a detection point corresponding to the pixel point with respect to the camera, and thereby determining a set of three dimensional coordinates including the three dimensional coordinates of all the detection points in the set of detection points;

determining a particular detection point in the set of detection points based on the set of three dimensional coordinates, and computing three dimensional relative coordinates of other detection points in the set of detection points with respect to the particular detection point, to obtain a matrix of three columns formed of three dimensional relative coordinates of all the detection points in the set of detection points; and performing a singular value decomposition process and a normalization process on the matrix of three columns to obtain the position information on each detection point.

5. The system according to claim 3, wherein extracting the surface information on each detection point comprises:

computing a mean image of the second group of light-source-illuminated images;

computing a set of differential images between the second group of light-source-illuminated images and the mean image;

determining a matrix of at least four columns, which is formed of a vector of at least four dimensions of each detection point in the set of detection points, the vector of at least four dimensions of each detection point being formed of a pixel value of the pixel point corresponding to the detection point, in the set of differential images;

performing a singular value decomposition process on the matrix of at least four columns; and obtaining the surface information on each detection point based on a result of the singular value decomposition process.

6. The system according to claim 3, wherein extracting the material information on each detection point comprises:

determining, for each detection point, a set of pixel values of the detection point correspondingly, in the third group of light-source-illuminated images;

computing a mean and a variance of the set of pixel values; and computing the material information on the detection point based on the mean and the variance of the set of pixel values.

7. The system according to claim 3, wherein the camera is further operative to capture a non-light-source-illuminated image of the face when the face is not illuminated by any one group of light of the at least one group of structured light, and wherein extracting the first set of features including a feature of each detection point in the set of detection points of the face comprises at least one of:

extracting the position information on each detection point based on the non-light-source-illuminated image and the first light-source-illuminated image captured when the face is illuminated by the first group of light;

extracting the surface information on each detection point based on the non-light-source-illuminated image and the second group of light-source-illuminated images captured when the face is illuminated successively by respective beams of light in the second group of light; and extracting the material information on each detection point based on the non-light-source-illuminated image and the third group of light-source-illuminated images captured when the face is illuminated successively by respective beams of light in the third group of light.

8. The system according to claim 7, wherein extracting the position information on each detection point comprises:

computing a differential image between the first light-source-illuminated image and the non-light-source-illuminated image;

computing a directional gradient of the differential image to determine a pixel point corresponding to a predetermined point of the raster in the differential image;

computing three dimensional coordinates of a detection point corresponding to the pixel point with respect to the camera, and thereby determining a set of three dimensional coordinates including the three dimensional coordinates of all the detection points in the set of detection points;

determining a particular detection point in the set of detection points based on the set of three dimensional coordinates and computing three dimensional relative coordinates of other detection points in the set of detection points with respect to the particular detection point, to obtain a matrix of three columns formed of three dimensional relative coordinates of all the detection points in the set of detection points; and performing a singular value decomposition process and a normalization process on the matrix of three columns to obtain the position information on each detection point.

9. The system according to claim 7, wherein extracting the surface information on each detection point comprises:

computing a set of differential images between the second group of light-source-illuminated images and the non-light-source-illuminated image;

determining a matrix of at least four columns which is formed of a vector of at least four dimensions of each detection point in the set of detection points, the vector of at least four dimensions of each detection point being formed of a pixel value of the pixel point corresponding to the detection point, in the set of differential images;

performing a singular value decomposition process on the matrix of at least four columns; and obtaining the surface information on each detection point based on a result of the singular value decomposition process.

10. The system according to claim 7, wherein extracting the material information on each detection point comprises:

computing a set of differential images between the third group of light-source-illuminated images and the non-light-source-illuminated image;

determining, for each detection point, a set of pixel values of the detection point correspondingly, in the set of differential images;

computing a mean and a variance of the set of pixel values; and computing the material information on the detection point based on the mean and the variance of the set of pixel values.

11. The system according to claim 1, wherein computing the similarity between the face and the face template comprises:

determining, for each detection point in the set of detection points, a corresponding point in the set of detected points of the face template;

computing a difference value between the feature of the detection point and the feature of the corresponding point, to obtain a set of difference values between all the detection points in the set of detection points and respective corresponding points; and using a pre-trained neutral network to compute the similarity between the face and the face template, based on the set of difference values.

12. The system according to claim 11, wherein determining the corresponding point in the set of detected points of the face template comprises:

detecting a first set of key points representing structure information on the face, in any one light-source-illuminated image of the set of light-source-illuminated images;

acquiring a second set of key points indicating the structure information on the face template, in the face template; and determining the corresponding point for each detection point, based on the first set of key points and the second set of key points.

13. The system according to claim 1, wherein computing the similarity between the face and the face template comprises:

determining, for each detected point in the set of detected points, a corresponding point in the set of detection points of the face;

computing a difference value between the feature of the detected point and the feature of the corresponding point, to obtain a set of difference values between all the detected points in the set of detected points and respective corresponding points; and using a pre-trained neutral network to compute the similarity between the face and the face template, based on the set of difference values.

14. The system according to claim 1, wherein extracting the first set of features including a feature of each detection point in the set of detection points of the face comprises:

detecting a face region image of each light-source-illuminated image in the set of light-source-illuminated images; and extracting the first set of features based on the detected face region image of each light-source-illuminated image.

15. A method for recognizing a face, comprising:

emitting at least one group of structured light to a face to be recognized, successively;

capturing a set of light-source-illuminated images of the face when the face is illuminated successively by each group of light of the at least one group of structured light;

extracting a first set of features including a feature of each detection point in a set of detection points of the face based on the set of light-source-illuminated images, the feature of each detection point comprising at least one of position information indicating three dimensional relative coordinates of the detection point, surface information indicating a relative surface normal of the detection point, and material information indicating a light absorption characteristic of the detection point;

acquiring a second set of features including a feature of each detected point in a set of detected points of a face template;

computing a similarity between the face and the face template based on the first set of features and the second set of features; and recognizing the face as being consistent with the face template if the similarity is larger than a threshold.

16. The method according to claim 15, wherein the at least one group of structured light comprises at least one of a first group of light emitted by a laser in a first group of light sources, a second group of light formed of light emitted successively by each light source in a second group of light sources, and a third group of light formed of light emitted successively by each light source in a third group of light sources;

extracting the first set of features including a feature of each detection point in the set of detection points of the face comprises at least one of:

extracting the position information on each detection point, based on a first light-source-illuminated image captured when the face is illuminated by the first group of light, wherein a raster of a predetermined pattern is arranged between the laser and the face;

extracting the surface information on each detection point, based on a second group of light-source-illuminated images captured when the face is illuminated successively by respective beams of light in the second group of light, wherein the second group of light sources comprises more than two light sources, directions in which the face is illuminated by at least three light sources of the more than two light sources not being correlated linearly; and extracting the material information on each detection point, based on a third group of light-source-illuminated images captured when the face is illuminated successively by respective beams of light in the third group of light, wherein the third group of light sources comprises more than two light sources arranged adjacently in space.

17. The method according to claim 16, further comprising:

capturing a non-light-source-illuminated image of the face when the face is not illuminated by any one group of light of the at least one group of structured light;

wherein extracting the first set of features including a feature of each detection point in the set of detection points of the face comprises at least one of:

extracting the position information on each detection point based on the non-light-source-illuminated image and the first light-source-illuminated image captured when the face illuminated by the first group of light;

extracting the surface information on each detection point based on the non-light-source-illuminated image and the second group of light-source-illuminated images captured when the face is illuminated successively by respective beams of light in the second group of light; and extracting the material information on each detection point based on the non-light-source-illuminated image and the third group of light-source-illuminated images captured when the face is illuminated successively by respective beams of light in the third group of light.

18. An apparatus for recognizing a face, comprising:

a light source operative to emit at least one group of structured light to a face to be recognized, successively;

a camera operative to capture a set of light-source-illuminated images of the face when the face is illuminated successively by each group of light of the at least one group of structured light; and a first communication interface operative to transmit the set of light-source-illuminated images to a computer communicatively connected with the apparatus, wherein the computer comprises:

a second communication interface operative to receive the set of light-source-illuminated images from the apparatus;

a processor;

a memory;

computer program instructions stored in the memory, which, when executed by the processor, perform steps of:

extracting a first set of features indicating features of a set of detection points of the face, based on the set of light-source-illuminated images, the features of the set of detection points comprising at least one of position information indicating three dimensional relative coordinates of the detection point, surface information indicating a relative surface normal of the detection point, and material information indicating a light absorption characteristic of the detection point;

acquiring a second set of features indicating features of a set of detected points of a face template;

computing a similarity between the face and the face template, based on the first set of features and the second set of features;

recognizing the face as being consistent with the face template if the similarity is larger than a threshold; and a third communication interface operative to transmit a face recognition result to the apparatus for recognizing a face.

19. The apparatus according to claim 18, wherein:

the light source comprises at least one of a first group of light sources, a second group of light sources and a third group of light sources, the first group of light sources comprises a laser, between which and the face there is arranged a raster of a predetermined pattern, the second group of light sources comprises more than two light sources, directions in which the face is illuminated by at least three light sources of the more than two light sources not being correlated linearly, the third group of light sources comprises more than two light sources arranged adjacently in space, the at least one group of structured light comprises at least one of a first group of light emitted by the laser in the first group of light sources, a second group of light formed of the light emitted successively by each light source in the second group of light sources, and a third group of light formed of the light emitted successively by each light source in the third group of light sources, and extracting the first set of features including a feature of each detection point in the set of detection points of the face comprises at least one of:

extracting the position information on each detection point, based on a first light-source-illuminated image captured when the face is illuminated by the first group of light;

extracting the surface information on each detection point, based on a second group of light-source-illuminated images captured when the face is illuminated successively by respective beams of light in the second group of light; and extracting the material information on each detection point, based on a third group of light-source-illuminated images captured when the face is illuminated successively by respective beams of light in the third group of light.

* * * * *